United States Patent
Boss et al.

(10) Patent No.: US 8,615,344 B2
(45) Date of Patent: Dec. 24, 2013

(54) METHOD AND SYSTEM TO MODIFY ROUTING INFORMATION BASED ON DETECTION OF RATE OF CHANGE OF PRESSURE IN TIRES

(75) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 13/112,019

(22) Filed: May 20, 2011

(65) Prior Publication Data

US 2012/0296515 A1  Nov. 22, 2012

(51) Int. Cl.
*G01M 17/02* (2006.01)
*G06F 19/00* (2011.01)

(52) U.S. Cl.
USPC .................. 701/32.3; 701/123; 340/442

(58) Field of Classification Search
USPC ........ 701/32.3, 29.1, 423, 439, 123; 340/442, 340/447; 73/614, 146
See application file for complete search history.

(56) References Cited

U.S. PATENT DOCUMENTS

| | | | |
|---|---|---|---|
| 6,404,330 B1 | 6/2002 | Sugisawa | |
| 6,459,967 B1 * | 10/2002 | Otto | 701/29.1 |
| 6,510,375 B2 | 1/2003 | Faye | |
| 6,918,289 B2 * | 7/2005 | Hayashi et al. | 73/146 |
| 7,543,489 B2 | 6/2009 | Abe et al. | |
| 7,563,021 B2 | 7/2009 | Ichihara et al. | |
| 2006/0185756 A1 * | 8/2006 | Sato et al. | 141/94 |
| 2008/0042817 A1 * | 2/2008 | Fogelstrom | 340/442 |
| 2010/0188202 A1 | 7/2010 | Kuchler et al. | |
| 2011/0196600 A1 * | 8/2011 | Henderson et al. | 701/123 |
| 2012/0044064 A1 * | 2/2012 | Maekawa et al. | 340/447 |

FOREIGN PATENT DOCUMENTS

JP  2003220810 A  8/2003

\* cited by examiner

*Primary Examiner* — Tan Q Nguyen
(74) *Attorney, Agent, or Firm* — Matthew Chung; Keohane & D'Alessandro, PLLC

(57) ABSTRACT

Embodiments of the present invention relate to a method, system and program product for monitoring the rate of deflation or inflation in vehicular tires to determine the time or distance it takes before the tire pressure of one or more tires enters an undesirable state. Under the present invention, tire specifications, environmental modifiers, vehicular modifiers, road and weather conditions, and current tire pressure for each tire are recorded as input to provide an alert with a route plan for a driver to bring a vehicle to a service station before tire pressure reaches an undesirable condition. In one embodiment, the system can inform the driver at what time in the future a tire will reach an undesirable condition. In another embodiment, the system can inform the driver at what distance (measured in miles, for example) a tire will reach an undesirable condition. In yet another embodiment, the system can modify a route in order to avoid an unsafe tire condition.

24 Claims, 5 Drawing Sheets

METHOD AND SYSTEM TO MODIFY ROUTING INFORMATION BASED ON DETECTION OF RATE OF CHANGE OF PRESSURE IN TIRES

TECHNICAL FIELD

In general, the present invention relates to vehicle route optimization. Specifically, the present invention relates to modifying route information based on a rate of change of pressure in vehicle tires in order to avoid unsafe or poor performance conditions.

BACKGROUND

Vehicle tire pressure is an important element in road safety as well as expense related to fuel economy. An underinflated tire condition can contribute significantly to accidents caused by blowouts, damaged rims, reduced effective navigation around obstacles, and reduced fuel economy. Over-inflated tires decrease tire-to-road surface contact, increasing stopping distances, increasing rate of balding, and limiting handling capabilities. Many vehicles have instructions (such as in an owner's manual) specifying an optimal quantity of air that should be placed in each of the vehicle's tires. For example, many passenger cars have the recommendation of 30 lbs. of pressure per tire. There are many vehicles on the market today which display generic warnings when a tire is improperly inflated. These warnings usually appear as indicators on a dashboard of a vehicle but can also be delivered electronically via email and other mediums (GM's OnStar® system for example, OnStar is a Registered Trademark of OnStar, LLC.). The warnings are also typically general in nature (e.g., the dashboard merely warns that a tire is low but does not say which tire). Other vehicles provide pressure readings for each tire, but require a vehicle operator to actively check these readings and interpret whether a current tire pressure is too low or high. Regular monitoring of tire pressure, either by a warning system or vehicle operator, increases vehicle safety and fuel economy.

SUMMARY

The present invention relates to a method, system and program product for monitoring the rate of deflation or inflation in vehicular tires to determine the time or distance it takes before the tire pressure of one or more tires enters an undesirable state. Under the present invention, tire specifications, environmental modifiers, vehicular modifiers, road and weather conditions, and current tire pressure for each tire are recorded as input to provide an alert with a route plan for a driver to bring a vehicle to a service station before tire pressure reaches an undesirable condition. In one embodiment, the system can inform the driver at what time in the future a tire will reach an undesirable condition. In another embodiment, the system can inform the driver at what distance (measured in miles, for example) a tire will reach an undesirable condition. In yet another embodiment, the system can modify a route in order to avoid an unsafe tire condition.

A first aspect of the present invention provides a method for vehicle route optimization based on a measured rate of change of tire deflation, comprising: recording specifications for at least one tire; recording at least one of: an environmental modifier, a road condition, a weather condition, and a vehicular modifier; recording a rate of change of pressure in the at least one tire; determining a threshold at which the pressure within the at least one tire becomes undesirable; determining, based on the rate of change, a point at which the pressure reaches the threshold; and presenting the point to a user. The method further comprises determining a location of a service station and presenting to the user directions to the service station; modifying an existing route in order to prevent the pressure from reaching the threshold; or determining a safe location for the user to pull over the vehicle before the point at which the pressure reaches the threshold.

A second aspect of the present invention provides a system for vehicle route optimization based on a measured rate of change of tire deflation, comprising: a bus; a processor coupled to the bus; and a memory medium coupled to the bus, the memory medium comprising instructions to: record specifications for at least one tire; record at least one of: an environmental modifier, a road condition, a weather condition, and a vehicular modifier; record a rate of change of pressure in the at least one tire; determine a threshold at which the pressure within the at least one tire becomes undesirable; determine, based on the rate of change, a point at which the pressure reaches the threshold; and present the point to a user. The memory medium further comprises instructions to determine a location of a service station and present to the user directions to the service station; modify an existing route in order to prevent the pressure from reaching the threshold; or determine a safe location for the user to pull over the vehicle before the point at which the pressure reaches the threshold.

A third aspect of the present invention provides a computer program product for vehicle route optimization based on a measured rate of change of tire deflation, the computer program product comprising a computer readable storage media, and program instructions stored on the computer readable storage media, to: record specifications for at least one tire; record at least one of: an environmental modifier, a road condition, a weather condition, and a vehicular modifier; record a rate of change of pressure in the at least one tire; determine a threshold at which the pressure within the at least one tire becomes undesirable; determine, based on the rate of change, at least one of: a time and a distance at which the pressure reaches the threshold; and present the at least one of time and distance to a user. The computer program product further comprising program instructions to determine a location of a service station and present to the user directions to the service station; modify an existing route in order to prevent the pressure from reaching the threshold; or determine a safe location for the user to pull over the vehicle before the at least one of time and distance at which the pressure reaches the threshold.

A fourth aspect of the present invention provides a method for vehicle route optimization based on a measured rate of change of tire deflation, comprising: deploying a computer infrastructure being operable to: record specifications for at least one tire; record at least one of: an environmental modifier, a road condition, a weather condition, and a vehicular modifier; record a rate of change of pressure in the at least one tire; determine a threshold at which the pressure within the at least one tire becomes undesirable; determine, based on the rate of change, at least one of: a time and a distance at which the pressure reaches the threshold; and present the at least one of time and distance to a user. The computer infrastructure is further operable to modify an existing route in order to prevent the pressure from reaching the threshold; determine a location of a service station; and present to the user directions to the service station.

BRIEF DESCRIPTION OF THE DRAWINGS

These and other features of this invention will be more readily understood from the following detailed description of the various aspects of the invention taken in conjunction with the accompanying drawings in which.

Figure 1:
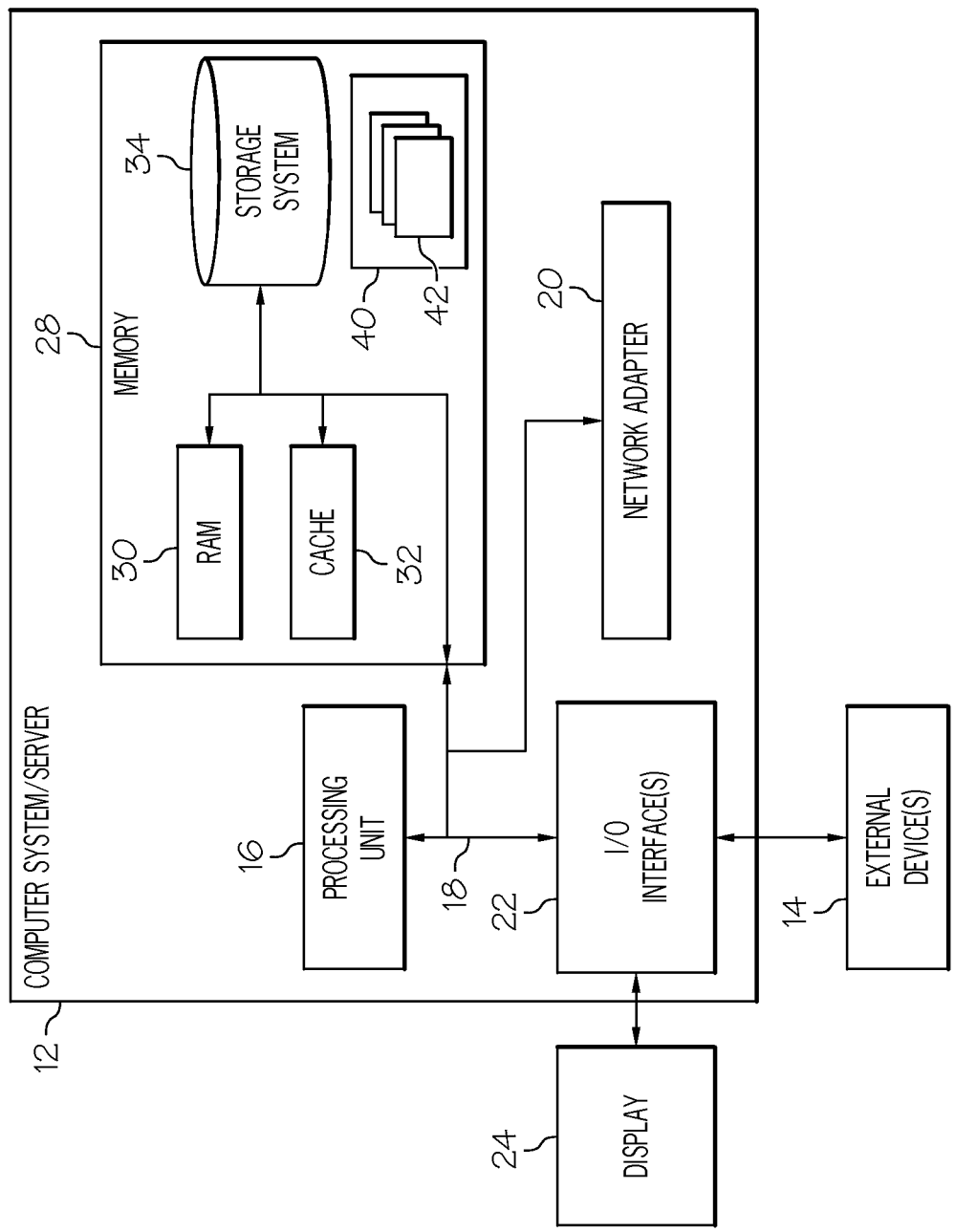
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The terms user and operator are utilized interchangeably throughout this discussion. It should be understood that these terms refer to the driver of a vehicle as well as to any person assisting in the operation of the vehicle. For example, a passenger assisting the driver in navigating also constitutes a vehicle operator or user.

As mentioned above, embodiments of the present invention relate to tire pressure variation monitoring and route plan compensation tools. In general, a vehicle tire is filled with air, which exerts a pressure on the inner surface of said tire. While an optimal pressure is desired for maximum performance and safety, tires may, nonetheless, enter a state of over- or under-inflation. The present invention monitors the rate at which pressure in vehicle tires changes in order to determine a time and distance at which further operation of the vehicle with the tires in their future state would be unadvisable. Factors including tire specifications, environmental modifiers, vehicular modifiers, road and weather conditions, and current tire pressures are evaluated in this determination. In one additional embodiment, the present invention determines an alternate route which prevents the tires from entering into a state which makes the vehicle unadvisable to operate. In another embodiment, the present invention further directs the vehicle operator to a service station where repair items such as air pumps and replacement tires may be found. In a third embodiment, the vehicle operator is advised to pull over in a safe location where a call for roadside assistance is placed.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multi-processor systems, microprocessor-based systems, set top boxes, programmable consumer electronics (e.g. smart phones, Global Positioning System (GPS) units), network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Pressure rate of change detection and route modifying program/utility 40, having a set (at least one) of program modules 42, may be stored in memory 28 by way of example, and not limitation, as well as an operating system, one or more application programs, other program modules, and program data. In general, pressure rate of change detection and route modifying program 40 performs the function of the present invention as described herein. For example, pressure rate of change detection and route modifying program 40 will determine a new GPS route based in part on a detected rate of change of pressure in at least one of a set of tires on a vehicle, and provide various outputs (e.g., spreadsheets, charts, etc.). Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is understood that this invention can be practiced in any type of computing environment, an example of which is a cloud computing environment. In any event, as indicated above, embodiments of the present invention provide an approach for detecting a time or distance restriction placed on a vehicle with one or more tires undergoing a change in pressure, and offering a modified route in order to avoid operating the vehicle once the tire renders the vehicle's operation unadvisable.

Figure 2:
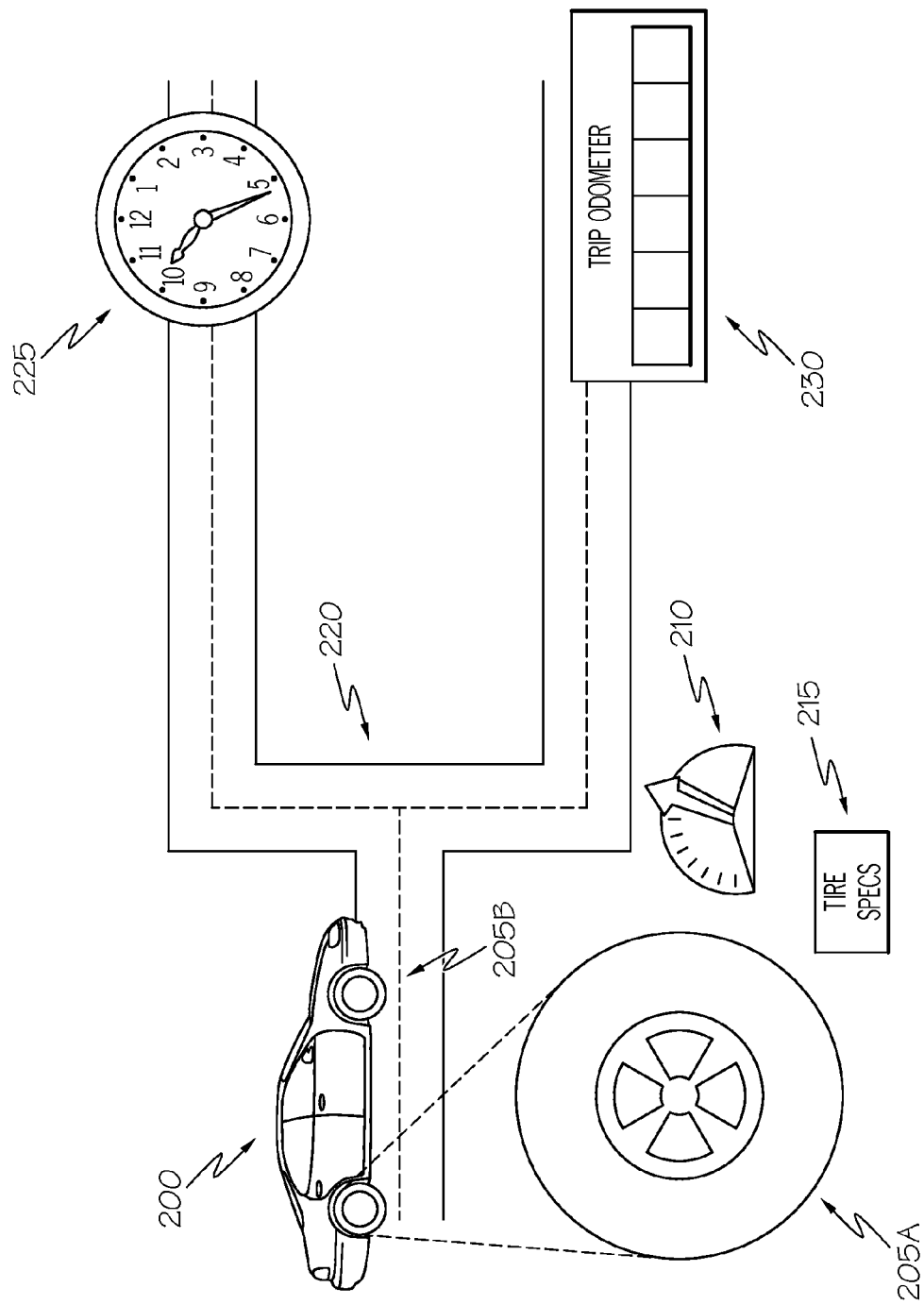
FIG. 2 depicts a road and vehicle environment according to an embodiment of the present invention.

Referring now to FIG. 2, an environment is depicted showing route 220 and vehicle 200 according to an embodiment of the present invention. A vehicle operator drives vehicle 200 along route 220. Route 220 may include a plurality of one or more roads, streets, highways, and other courses typically transverse by motor vehicles, but not limited to such. Route 220 may also include GPS (Global Positioning System) routes. Attached to the base of vehicle 200 is plurality of tires 205A-B, usually numbering four (4) on a typical passenger car, although some vehicles have more or less tires. As shown in FIG. 2, deflating tire 205A has begun to "go flat." In some embodiments of the invention, tires may also become over inflated due to, for example, rising temperatures or loads on the vehicle and tires. Tire pressure monitoring device 210 records a change in deflating tire 205A pressure over time. For example, in one non-limiting method, a first pressure at time one is recorded followed by a second pressure at time two; the difference between the first and second pressures divided by the difference between time one and two yields the rate at which the pressure is changing. After a rate of change in pressure is extrapolated by the above method or other techniques which will be apparent to those trained in the art, a determination is made based on the pressure change from pressure monitoring device 210 to determine a point when/where the change in pressure in deflating tire 205A renders vehicle 200 unadvisable to drive with respect to a safety, performance, etc., threshold. Time 225 at which vehicle 200, having tire 205A, should no longer be driven is reported to the vehicle operator. Alternatively, distance 230 at which vehicle 200, having tire 205A, should no longer be driven is reported to the vehicle operator. Additional factors which influence the longevity of a tire undergoing a change in pressure, such as tire specifications 215, are also considered in the determination and will be discussed in greater detail below. Multiple tires on a vehicle may be simultaneously monitored, as it is reasonable to expect the air pressures of each tire to individually change.

Figure 3:
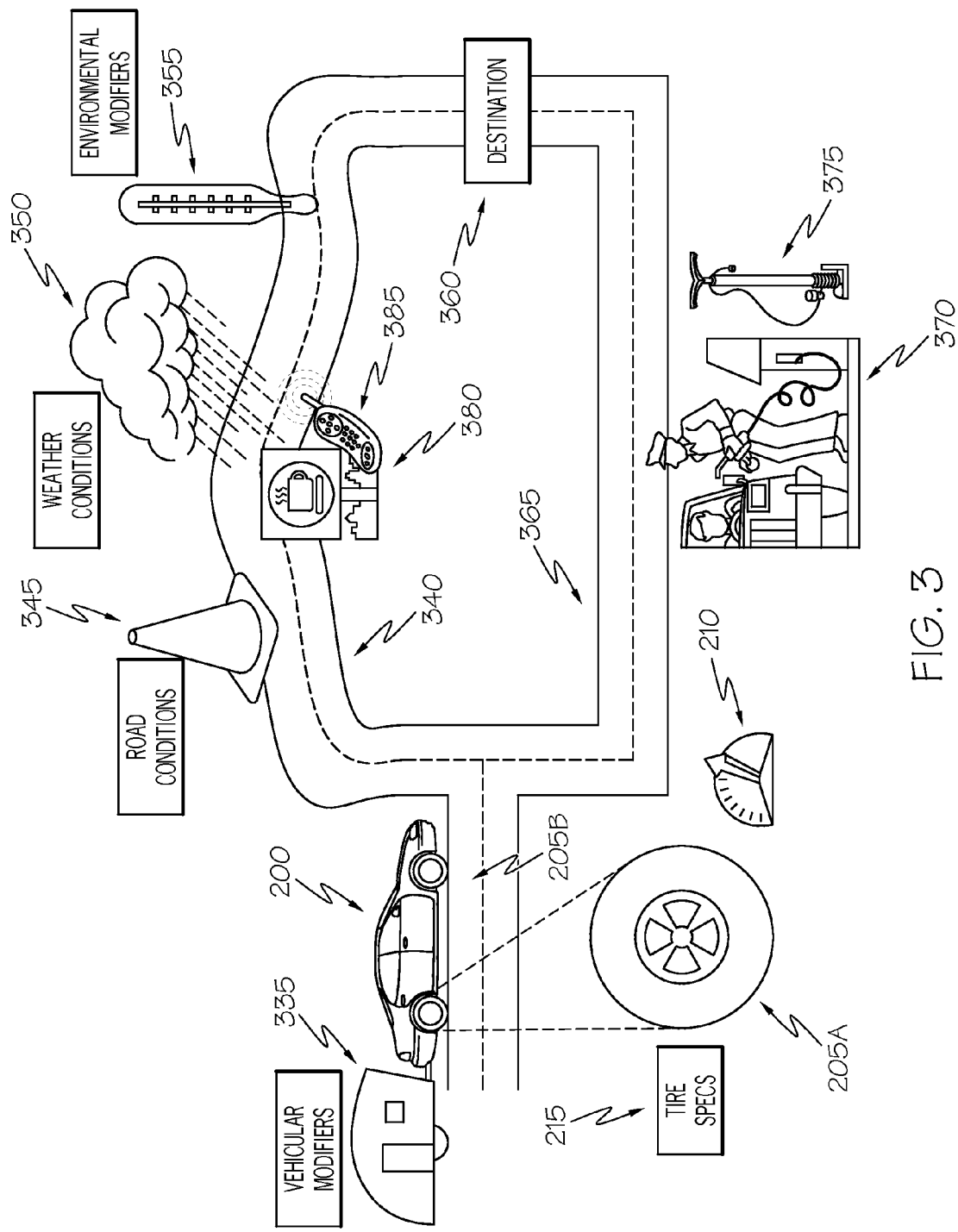
FIG. 3 depicts an illustrative road and vehicle environment according to an embodiment of the present invention.

Referring now to FIG. 3, an illustrative environment is shown depicting routes 340 and 365 and vehicle 200 according to an embodiment of the present invention. A vehicle operator drives vehicle 200 along routes 340 and 365, both of which may include a plurality of one or more roads, streets, highways, and other courses typically transverse by motor vehicles, but not limited to such. They may also include GPS routes. As shown in FIG. 2 and repeated here, vehicle 200 has attached at its base plurality of tires 205A-B, where deflating tire 205A has begun to "go flat." Tire pressure monitoring device 210 records a change in deflating tire 205A pressure over time in order to determine a rate of change in tire pressure. Additional factors/considerations which play a role in a tire's expected longevity are also recorded. Tire specifications for tire plurality 205A-B are recorded and may include, for example, recommended tire pressure, recommended maximum and minimum tire pressures, load modifiers, speed ratings, and other manufacture's specifications. Factors associated with vehicle 200 may also be recorded as vehicle modifiers 335, such as towing a trailer or the weight of vehicle 200. As vehicle 200 travels along intended route 340 to destination 360, factors external to vehicle 200 and tire plurality 205A-B and present in the environment may also be recorded. For example, road conditions 345, which include, but are not limited to, road quality, presence of construction and detours, and surface conditions may be recorded. Weather conditions 350 may also be recorded. These include, but are not limited to, precipitation (e.g. snow, rain), slush, ice, wind, and fog. Additionally, environmental modifiers 355 may be recorded, such as, but not limited to, the effect of temperature on tire pressure.

One or more of tire specifications 215, vehicle modifiers 335, road conditions 345, weather conditions 350, and environmental modifiers 355 may be employed with the determined rate of change in tire pressure from tire pressure monitoring device 210 to determine the longevity of deflating tire 205A. The longevity of tire 205A is the location or time at which the pressure within tire 205A reaches a predetermined threshold. The threshold may, for example, be determined using tire specifications 215 (e.g., maximum/minimum pressures) or safety or performance parameters. Once the longevity of tire 205A has been determined, or the point at which the tire become undesirable and the vehicle unadvisable to drive, the vehicle operator is informed. Further recommendations may be made, including advising the vehicle operator to pull over at safe area 380 and providing option to call for roadside assistance 385. Another recommendation is alternative route 365, which will allow vehicle 200 to reach destination 360 before the pressure in deflating tire 205A reaches the threshold. Intended route 340, which prior to detection of an inflating/deflating tire may preexist in a navigating device such as a GPS, is modified to create alternative route 365. In some embodiments, alternative route 365 may include directions to service station 370, having repair items such as air pump 375 or spare tires. A service station is any place having the capability to repair faulty, deflating, overinflated, etc., tires through tools such as, but not limited to, air pumps, patches, and replacement tires. Public databases, for example, may be examined to retrieve the locations of service stations. In the event that service station 370 cannot be reached before the pressure in deflating tire 205A reaches the threshold, the vehicle operator will be advised to pull over at safe area 380.

Figure 4:
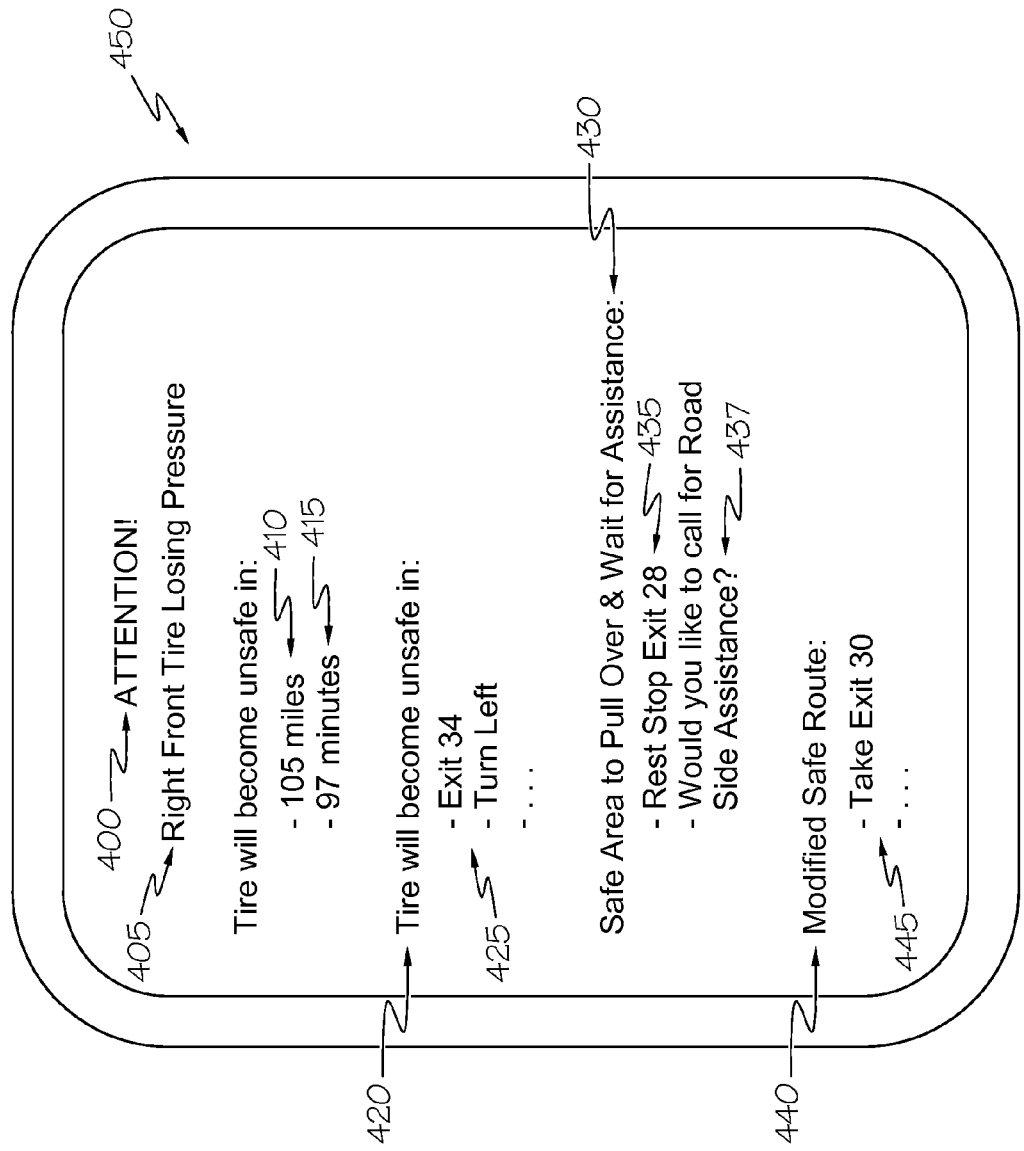
FIG. 4 depicts a user interface according to an embodiment of the present invention.

Referring now to FIG. 4, user interface 450 according to an embodiment of the present invention is depicted. In the event that a determination is made from rate of pressure change that one or more tires 205 of vehicle 200 (see FIGS. 2 and 3) being operated by a user will reach a threshold pressure that threatens safety, performance, or some other important vehicle feature, the user will receive warning 400 according to the present invention. Embodiments of warning 400 may take several forms, including, but not limited to, visual (e.g., an alert on a vehicle's dashboard), audio (e.g., a voice-over speaking to a driver), or electronic (e.g., a message sent to an electronic or cellular device). Generally, warning 400 informs the user of tire problem 405 and approximates the vehicle's remaining range in distance 410 or time 415 remaining. In a typical embodiment, the user is also presented with options. For example, in FIG. 4, the first option listed is service station 420 with corresponding directions 425. However, this option will not be presented if the service station is beyond the vehicle's range given the state of tire 205B (FIGS. 2 and 3). Alternatively, route 435 to safe location 430 is presented, with option to call for roadside assistance 437. Option to call for roadside assistance 437 includes, but is not limited to, a preconfigured automated call, an automated call made if directed by the user, and presenting the user with a set of one or more contacts for roadside assistance services that the user may call him or herself. Safe location 430 option may be presented even if service stations and alternative routes are available, as it is sometimes more desirable to stay on one's original route than deviate. Additionally, modified safe route 440 and directions 445 are presented if it is possible to take a route which prevents the tire from reaching the pressure threshold. These are only intended as examples of the information and options which the present invention could present to a user. They are not intended to be limiting nor all-inclusive examples.

Figure 5:
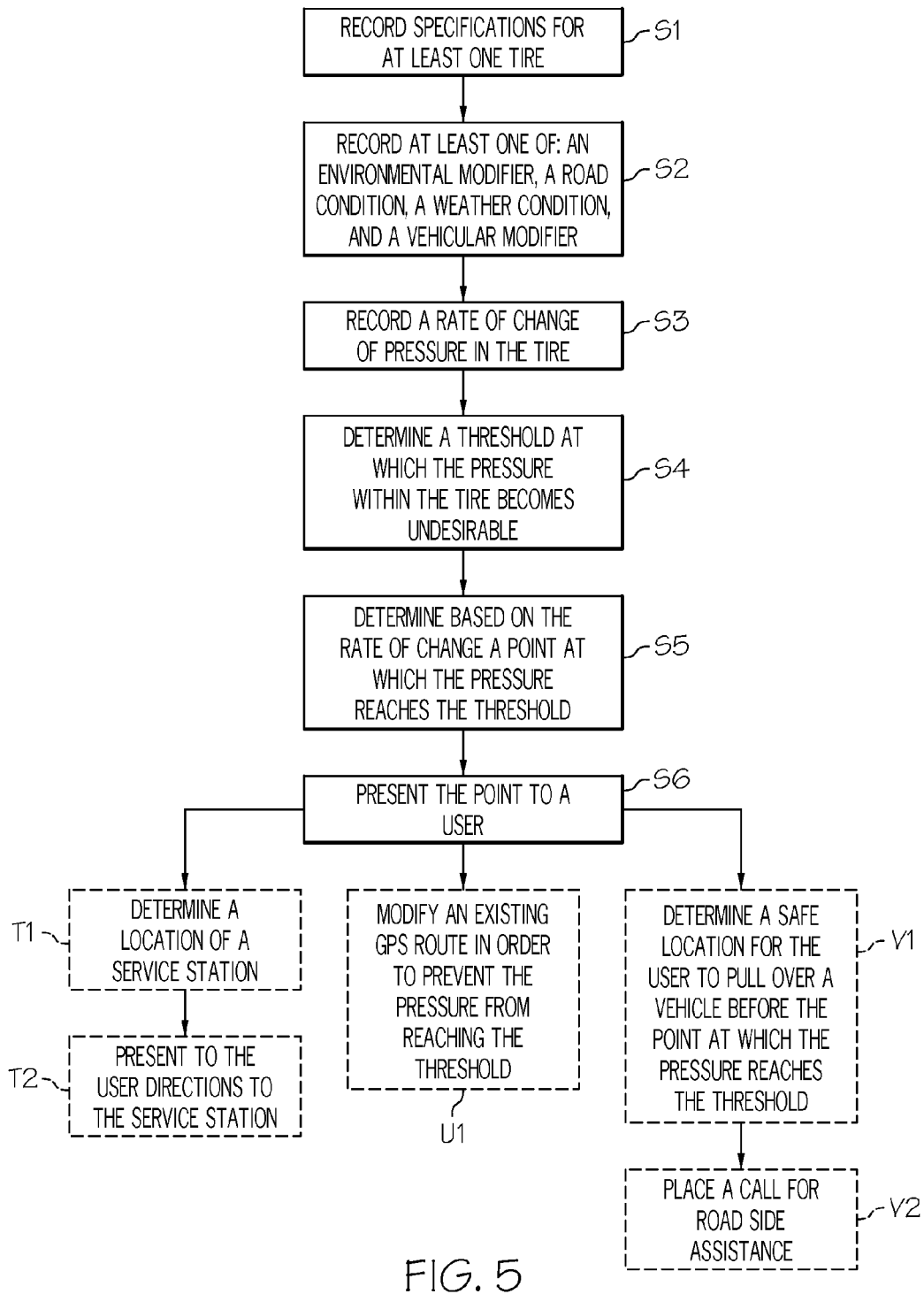
FIG. 5 depicts a method flow diagram according to an embodiment of the present invention.

Referring now to FIG. 5, a method flow diagram according to an embodiment of the present invention is shown. In step S1, specifications for at least one tire are recorded. In step S2, at least one of: an environmental modifier, a road condition, a weather condition, and a vehicular modifier, are recorded. In step S3, a rate of change of pressure in the tire is recorded. In step S4, a threshold at which the pressure within the tire becomes undesirable is determined. In step S5, based on the rate of change, a point at which the pressure reaches the threshold is determined. It may be the case that the rate of change in pressure is so slow that a vehicle will reach its destination before the point at which the pressure reaches the threshold. In this case, step S6 (discussed below) may not be necessary. Also the rate of change in pressure may be negligibly small or undetectable, in which case the rate of change in pressure in the tires will continue to be monitored. In step S6, the point at which the pressure reaches the threshold is presented to a user. Several sets of optional steps may also be included in embodiments of the preset invention. In one embodiment, optional step T1 continues from step S6. In step T1, a location of a service station is determined. In optional step T2, directions to the service station are presented to the user. In another embodiment, optional step U1 continues from step S6. In step U1, an existing route is modified in order to prevent the pressure from reaching the threshold. In another embodiment, optional step V1 continues from step S6. In step V1, a safe location is determined for the user to pull over a vehicle before the point at which the pressure reaches the threshold. In optional step V2, a call for roadside assistance is placed.

While shown and described herein as a solution for vehicle route optimization based on measured rate of change in tire pressure, it is understood that the invention further provides various alternative embodiments. For example, in one embodiment, the invention provides a computer-readable/useable medium that includes computer program code to enable a computer infrastructure to provide vehicle route optimization based on measured rate of change in tire pressure functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide a vehicle route optimization based on measured rate of change in tire pressure. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for vehicle route optimization based on measured rate of change in tire pressure. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for vehicle route optimization based on a measured rate of change of tire pressure, comprising:
    recording specifications for at least one tire;
    recording a vehicular modifier, the vehicular modifier comprising at least one of a recommended tire pressure, a recommended maximum tire pressure, a recommended minimum tire pressure, a load modifier, and a speed rating;
    recording a rate of change of pressure in the at least one tire;
    determining a threshold at which the pressure within the at least one tire becomes undesirable;
    determining, based on the rate of change and the vehicular modifier, a point at which the pressure reaches the threshold; and
    presenting the point to a user.

2. The method of claim 1, the point at which the pressure reaches the threshold being one of: a point in time and a distance point on a driving route.

3. The method of claim 1, the method further comprising:
    determining a location of a service station; and
    presenting to the user directions to the service station, wherein the service station may be reached at a point in time before the point at which the pressure reaches the threshold.

4. The method of claim 1, the method further comprising modifying an existing route in order to prevent the pressure from reaching the threshold.

5. The method of claim 1, the method further comprising determining a safe location for the user to pull over a vehicle before the point at which the pressure reaches the threshold.

6. The method of claim 5, the method further comprising placing a call for roadside assistance.

7. The method of claim 1, wherein the undesirable threshold is a measure of at least one of: safety and performance.

8. The method of claim 1, wherein the presenting the point to a user is through at least one of: a visual, an audio, and an electronic interface.

9. A system for vehicle route optimization based on a measured rate of change of tire pressure, comprising:
    a bus;
    a processor coupled to the bus; and
    a memory medium coupled to the bus, the memory medium comprising instructions to:
        record specifications for at least one tire;
        record an environmental modifier;
        record a rate of change of pressure in the at least one tire;
        determine a threshold at which the pressure within the at least one tire becomes undesirable;
        determine, based on the rate of change and the environmental modifier, a point at which the pressure reaches the threshold; and
        present the point to a user.

10. The system of claim 9, the point at which the pressure reaches the threshold being one of: a point in time and a distance point on a driving route.

11. The system of claim 9, the memory medium further comprising instructions to:
    determine a location of a service station; and
    present to the user directions to the service station, wherein the service station may be reached at a point in time before the point at which the pressure reaches the threshold.

12. The system of claim 9, the memory medium further comprising instructions to modify an existing route in order to prevent the pressure from reaching the threshold.

13. The system of claim 9, the memory medium further comprising instructions to determine a safe location for the user to pull over a vehicle before the point at which the pressure reaches the threshold.

14. The system of claim 13, the memory medium further comprising instructions to place a call for roadside assistance.

15. The system of claim 9, wherein the undesirable threshold is a measure of at least one of: safety and performance.

16. The system of claim 9, wherein the point is presented to a user through at least one of: a visual, an audio, and an electronic interface.

17. A computer program product for vehicle route optimization based on a measured rate of change of tire pressure, the computer program product comprising a computer readable storage media, and program instructions stored on the computer readable storage media, to:
   record specifications for at least one tire;
   record a road condition;
   record a rate of change of pressure in the at least one tire;
   determine a threshold at which the pressure within the at least one tire becomes undesirable;
   determine, based on the rate of change and the road condition, at least one of: a time and a distance at which the pressure reaches the threshold; and
   present the at least one of time and distance to a user.

18. The computer program product of claim 17, the computer program product further comprising program instructions to:
   determine a location of a service station; and
   present to the user directions to the service station, wherein the service station may be reached at a time before the time at which the pressure reaches the threshold.

19. The computer program product of claim 17, the computer program product further comprising program instructions to modify an existing route in order to prevent the pressure from reaching the threshold.

20. The computer program product of claim 17, the computer program product further comprising program instructions to:
   determine a safe location for the user to pull over a vehicle before the at least one of time and distance at which the pressure reaches the threshold; and
   place a call for roadside assistance.

21. The computer program product of claim 17, wherein the undesirable threshold is a measure of at least one of: safety and performance.

22. The computer program product of claim 17, wherein the point is presented to a user through at least one of: a visual, an audio, and an electronic interface.

23. A method for deploying a system for vehicle route optimization based on a measured rate of change of tire pressure, comprising:
   deploying a computer infrastructure being operable to:
      record specifications for at least one tire;
      record a weather condition;
      record a rate of change of pressure in the at least one tire;
      determine a threshold at which the pressure within the at least one tire becomes undesirable;
      determine, based on the rate of change and the weather condition, at least one of: a time and a distance at which the pressure reaches the threshold; and
      present the at least one of time and distance to a user.

24. The method of claim 23, the computer infrastructure being further operable to:
   modify an existing route in order to prevent the pressure from reaching the threshold;
   determine a location of a service station; and
   present to the user directions to the service station, wherein the service station may be reached at a point in time before the point at which the pressure reaches the threshold.

* * * * *